(12) United States Patent
Friesen et al.

(10) Patent No.: US 8,808,929 B2
(45) Date of Patent: Aug. 19, 2014

(54) METAL-AIR CELL COMPRISING AN ELECTROLYTE WITH A ROOM TEMPERATURE IONIC LIQUID AND HYGROSCOPIC ADDITIVE

(76) Inventors: Cody A. Friesen, Fort McDowell, AZ (US); Ramkumar Krishnan, Gilbert, AZ (US); Toni Tang, Gilbert, AZ (US); Derek Wolfe, Scottsdale, AZ (US)

(*) Notice: Subject to any disclaimer, the term of this patent is extended or adjusted under 35 U.S.C. 154(b) by 143 days.

(21) Appl. No.: 13/085,714

(22) Filed: Apr. 13, 2011

(65) Prior Publication Data
US 2011/0305959 A1 Dec. 15, 2011

Related U.S. Application Data

(60) Provisional application No. 61/355,081, filed on Jun. 15, 2010.

(51) Int. Cl.
*H01M 12/06* (2006.01)
*H01M 10/0569* (2010.01)
*H01M 10/0567* (2010.01)

(52) U.S. Cl.
CPC .............. *H01M 12/06* (2013.01); *Y02E 60/128* (2013.01); *H01M 10/0569* (2013.01); *H01M 10/0567* (2013.01)
USPC .......................................... 429/405; 429/403

(58) Field of Classification Search
USPC .................. 429/403, 405; 252/62.2
See application file for complete search history.

(56) References Cited

U.S. PATENT DOCUMENTS

| | | | |
|---|---|---|---|
| 5,827,602 | A | 10/1998 | Koch |
| 6,355,369 | B1 | 3/2002 | Iarochenko |
| 6,365,301 | B1 | 4/2002 | Michot et al. |
| 6,608,005 | B2 | 8/2003 | Palmer |
| 2006/0228073 | A1 | 10/2006 | Mukawa et al. |
| 2007/0263341 | A1 | 11/2007 | Tsukada |
| 2009/0284229 | A1 | 11/2009 | Friesen |
| 2010/0119895 | A1 | 5/2010 | Friesen |
| 2010/0285375 | A1 | 11/2010 | Friesen |
| 2010/0316935 | A1 | 12/2010 | Friesen |
| 2011/0027664 | A1 | 2/2011 | Burchardt |
| 2011/0039181 | A1 | 2/2011 | Friesen |

FOREIGN PATENT DOCUMENTS

| | | |
|---|---|---|
| EP | 0058090 | 8/1982 |
| EP | 1785184 | 5/2007 |
| JP | 2008293678 A | 12/2008 |
| WO | 97/02252 A1 | 1/1997 |
| WO | 2004045005 A2 | 5/2004 |
| WO | 2006051897 A1 | 5/2006 |
| WO | 2007142600 A1 | 12/2007 |
| WO | 2007144357 A1 | 12/2007 |

OTHER PUBLICATIONS

Linden et al. "Handbook of Batteries" $3^{rd}$ edition, Chapters 13 and 38, McGraw-Hill, 2002.*

(Continued)

*Primary Examiner* — Gregg Cantelmo

(57) ABSTRACT

An electrochemical cell comprising an electrolyte comprising water and a hydrophobic ionic liquid comprising positive ions and negative ions. The electrochemical cell also includes an air electrode configured to absorb and reduce oxygen. A hydrophilic or hygroscopic additive modulates the hydrophobicity of the ionic liquid to maintain a concentration of the water in the electrolyte is between 0.001 mol % and 25 mol %.

23 Claims, 2 Drawing Sheets

(56) References Cited

OTHER PUBLICATIONS

IPDL Machine translation of the detailed description of JP 2008-293678A, Dec. 2008.*
Kuboki et al., "Linthium-air batteries using hydrophobic room temperature ionic liquid electrolyte," Journal of Power Sources, Elsevier SA, CH, vol. 146, No. 1-2, Aug. 26, 2005, pp. 766-769.
Xu et al., "Novel zinc ion conducting polymer gel electrolytes based on ionic liquids," Electrochemistry Communication, Elsevier, Amsterdam, NL, vol. 7, No. 12, Dec. 1, 2005, pp. 1309-1317.
International Preliminary Report on Patentability related application PCT/GB2009/051676 mailed Jun. 23, 2011.
Diaw M. et al., Mixed ionic liquid as electrolyte for lithium batteries, Journal of Power Sources, Elsevier SA, CH, vol. 146, No. 12, 2005, pp. 682-684.
Chinese Office Action received in Chinese Patent Application No. 20112116772.3, mailed Aug. 23, 2011.
Intl. Preliminary Report on Patentability dated Dec. 19, 2012 of PCT/US2011/032233 filed Apr. 13, 2011 (10 pages).

* cited by examiner

METAL-AIR CELL COMPRISING AN ELECTROLYTE WITH A ROOM TEMPERATURE IONIC LIQUID AND HYGROSCOPIC ADDITIVE

RELATED APPLICATIONS

This application claims priority to U.S. Provisional Application Ser. No. 61/355,081, the entirety of which is incorporated herein.

This invention was made with U.S. government support under Contract No. DB-AR-00000038 awarded by the Department of Energy. The government has certain rights in the invention.

FIELD OF THE INVENTION

Embodiments of the invention are related to electrochemical metal-air cells and more particularly to electrochemical metal-air cells having an ionically conductive medium comprising a tuned hydrophobic ionic liquid.

BACKGROUND

Metal-air batteries typically include a fuel electrode at which metal fuel is oxidized, an air electrode at which oxygen is reduced, and an electrolyte for providing ion conductivity. A significant limiting factor with conventional metal-air batteries is the evaporation of the electrolyte solution (i.e., the ionically conductive medium), particularly the evaporation of the solvent, such as water in an aqueous electrolyte solution. Because the air electrode is required to be air permeable to absorb oxygen, it is also may permit the solvent vapor, such as water vapor, to escape from the cell. Over time, the cell becomes incapable of operating effectively because of the depletion of the solvent. Indeed, in many cell designs this evaporation issue renders the cell inoperable before the fuel is consumed. And this issue is exacerbated in secondary (i.e., rechargeable) cells, because the fuel may be re-charged repeatedly over the life of the cell, whereas the electrolyte solution cannot (absent replenishment from an external source).

Additionally, there are two other problems associated with aqueous electrolyte batteries: water electrolysis during recharging and self discharge. During recharge, a current is passed through the battery to reduce the oxidized fuel at the fuel electrode. Some of the current, however, electrolyzes the water resulting in hydrogen evolution (reduction) at the fuel electrode and oxygen evolution (oxidation) at the oxygen electrode as represented in the following equations:

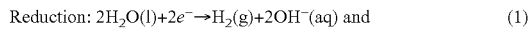

Reduction: $2H_2O(l) + 2e^- \rightarrow H_2(g) + 2OH^-(aq)$ and (1)

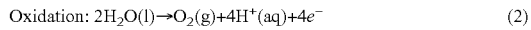

Oxidation: $2H_2O(l) \rightarrow O_2(g) + 4H^+(aq) + 4e^-$ (2)

In this manner, further aqueous electrolyte is lost from the battery. Additionally, the electrons that are consumed in reducing hydrogen are not available to reduce the fuel oxide. Therefore, the parasitic electrolysis of the aqueous electrolyte reduces the round trip efficiency of the secondary battery.

Self-discharge may result from impurities in the electrodes or reaction with the electrolyte. Typically, self-discharge from impurities in the electrodes is small (2-3% loss per month). The reaction of an active metal with water and/or $O_2$ dissolved in the water, however, may be quite high (20-30% per month).

To compensate for these problems, metal-air batteries with aqueous electrolyte solutions are typically designed to contain a relatively high volume of electrolyte solution. Some cell designs even incorporate means for replenishing the electrolyte from an adjacent reservoir to maintain the electrolyte level. However, either approach adds to both the overall size of the cell, as well as the weight of the cell, without enhancing the cell performance (except to ensure that there is a significant volume of electrolyte solution to offset evaporation of the water or other solvent over time). Specifically, the cell performance is generally determined by the fuel characteristics, the electrode characteristics, the electrolyte characteristics, and the amount of electrode surface area available for reactions to take place. But the volume of electrolyte solution in the cell generally does not have a significant beneficial effect on cell performance, and thus generally only detracts from cell performance in terms of volumetric and weight based ratios (power to volume or weight, and energy to volume or weight). Also, an excessive volume of electrolyte may create a higher amount of spacing between the electrodes, which may increase ohmic resistance and detract from performance.

The use of non-aqueous systems for electrochemical cells has been suggested (see e.g., U.S. Pat. No. 5,827,602). In non-aqueous systems, the aqueous electrolyte may be replaced with an ionic liquid. Ionic liquids which Contain a strong Lewis acid such as $AlCl_3$, however, are known to liberate toxic gases when exposed to moisture. The use of hydrophobic ionic liquids that resist moisture and hence do not produce toxic gases has been investigated for use in sealed lithium-ion batteries. It would be advantageous to have hydrophobic electrolytes suitable for use in metal-air batteries.

SUMMARY OF THE INVENTION

An embodiment of the invention relates to an electrochemical cell comprising an ionically conductive medium comprising a hydrophobic ionic liquid comprising positive ions and negative ions and at least one hydrophilic additive. The cell also comprises a fuel electrode for oxidizing a fuel and an air electrode configured to absorb and reduce gaseous oxygen. The hygroscopic additive modulates the hydrophobicity of the ionic liquid to maintain the concentration of the water in the ionically conductive medium between 0.1 mol % and 25 mol % when exposed to ambient air at standard conditions across a relative humidity of 15% to 95%.

In preferred embodiments, the hydrophilic additive is hygroscopic. Another embodiment of the invention relates to the ionically conductive medium per se for use in the electrochemical cell.

Other objects, aspects, and advantages of the present invention will become apparent from the following detailed description, the accompanying drawings, and the appended claim.

BRIEF DESCRIPTION OF THE DRAWINGS

The invention may best be understood by referring to the following description and accompanying drawings that are used to illustrate embodiments of the invention.

DETAILED DESCRIPTION

Figure 1:
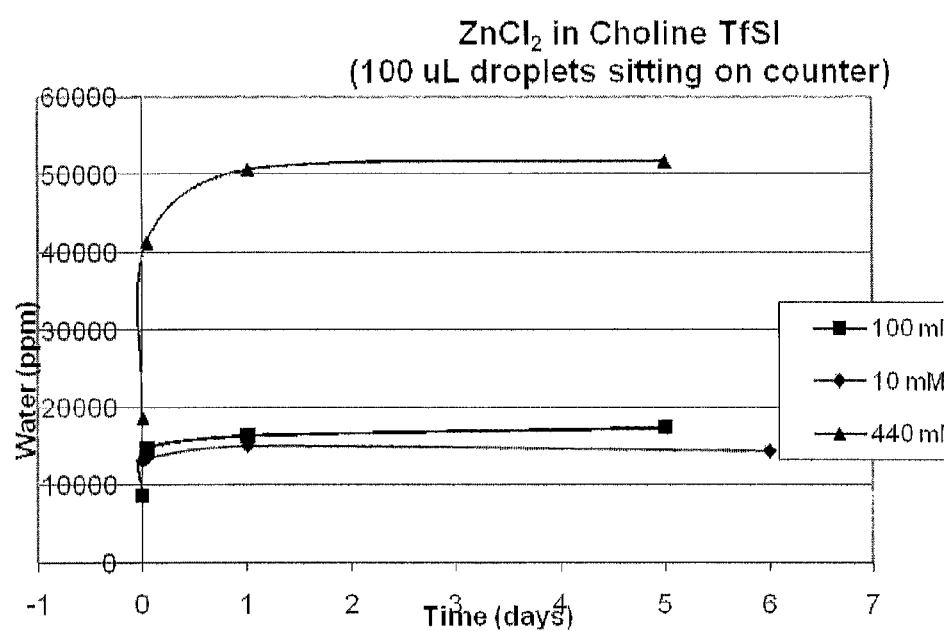
FIG. 1 is a plot of the water concentration as a function of time for Choline bis(trifluoromethylsulfonyl)imide/$ZnCl_2$.

Embodiments of the invention include an electrochemical cell having a hydrophobic ionic liquid with a water solubility between 0.001% and 25% (mol). For the purposes of this application, all percentages herein are in ppm unless otherwise stated. Preferably, the water solubility is between 0.1% and 10%. Preferably, the water solubility is between 1% and 5%. Alternatively, the water content may be between 0.001% and 1%. Alternatively, the water content may be between 0.1% and 1%. Preferably, the hydrophobic ionic liquid is compatible with the anode metal of the air-metal cell and capable of supporting one or more reduced oxygen species. The hydrophobic ionic liquid is also preferably capable of supporting oxide oxidation for recharge and has a high solubility for electrochemical reaction products produced in the cell.

Embodiments of the invention maintain a water content between 0.001% and 25% as the relative humidity varies from 0.1% to 99% or 10% to 90% at a temperature of 20° C. and a pressure of 1 atm (i.e., standard conditions). Other embodiments maintain a water content between 0.1% and 10% as the relative humidity varies from 0.1% to 99% at a temperature of 20° C. and a pressure of 1 atm. Other embodiments maintain a water content between 0.5% and 10% as the relative humidity varies from 10% to 90% at a temperature of 20° C. and a pressure of 1 atm. Still other embodiments maintain a water content between 0.1% and 10% as the relative humidity varies from 10% to 90% at a temperature of 20° C. and a pressure of 1 atm. All these conditions generally refer to ambient air (i.e., the normal atmospheric air, which is the typical operating environment of the cell, and the air may be exposed to the ionic liquid through the porosity of the air electrode as discussed below.

Ionic liquids generally refer to salts that form stable liquids comprising ions. That is, ionic liquids are fully dissociated, consisting essentially of negative and positive ions. Thus, ionic liquids inherently conduct electricity. Further, ionic liquids have negligible vapor pressure, low viscosity, wide liquidus range (up to 400° C.), high thermal stability, and a large electrochemical window (>5V). Because of these properties, ionic liquids typically will not evaporate or be consumed during the charge/discharge cycle of an electrochemical cell. Embodiments of the invention include ionic liquids which have a vapor pressure at or below 1 mm Hg at 20° C. above its melting point, and preferably at or below 0.1 mmHg or zero or essentially immeasurable at 20° C. above its melting point. Room temperature ionic liquids ("RTIL") are salts which form a stable liquid at 100° C. or below at 1 atm. Pressure (i.e., they have a melting point at 100° C. or below at 1 atm.). For the purposes of this application, a low temperature ionic liquid is defined as an ionic liquid having a melting point at or below 150° C. at 1 atm. Low temperature ionic liquids may also include the RTIL species.

However, even though low temperature or room temperature ionic liquids are defined by their respective melting points at 1 atm., in some embodiments the cell may be operated in an environment with a different pressure, and thus the melting point may vary with the operating pressure. Thus reference to a melting point at 1 atm. is used as a reference point to define these liquids, and does not imply or restrict its actual use conditions in operation.

ILs generally come in two forms: protic and aprotic. Protic ILs have available protons which may be oxidized or reduced or may coordinate with negative ions, such as reduced oxygen. These available protons have been found to increase the oxygen reduction reaction. Some examples of protic ILs are synthesized from combinations of anions tetrachloroaluminate, bis(trifluoromethylsulfonyl)imide, methylsulfonate, nitrate, and acetate, and cations triethylammonium, diethylmethylammonium, dimethylethylammonium, dimethylethylammonium triflate, ethylammonium, α-picolinium, pyridinium, and 1,8-bis(dimethylamino)naphthalene, 2,6-di-tert-butylpyridine, and derivatives of the guanadines. Aprotic ILs typically do not have proton activity. Some examples of aprotic RTILs are synthesized from combinations of anions chloride (Cl$^-$), hexafluorophosphate (PF$_6^-$), iodide, tetrafluoroborate, bis(trifluoromethylsulfonyl)imide (C$_2$F$_6$NO$_4$S$_2^-$) (TFSI), trifluoromethanesulfonate (CF$_3$O$_3$S$^-$), and cations imidazolium, sulfonium, morpholinium, choline, pyrrolidinium, quaternized ammonium or phosphonium and their derivatives. Many other options exist, and these lists of examples are not intended to be limiting in any way.

Many ionic liquid are highly hydrophobic. For these ILs, the water content of the ionically conductive medium (i.e., the electrolyte) is less than 0.1% and may be essentially zero. In embodiments of the present invention, however, the electrolyte may include appreciable amounts of water. For example, the water content may be between 0.001% and 25%. In an embodiment, the water content may be between 0.1% and 1%. In another embodiment, the water content may be between 1% and 5%. The IL systems may be protic or aprotic.

In a zinc-air battery using ionic liquid electrolytes, the water content is typically controlled to minimize hydrogen evolution, control plating morphology, and maintain a constant water activity within the cell. On discharge, Zn metal is oxidized at the fuel electrode and solvated or complexed into solution, releasing electrons into the circuit. Simultaneously, molecular oxygen is reduced at the air electrode consuming those electrons released at the anode. Upon reaching the solubility of zinc ions, ZnO is precipitated within the cell. On charge, Zn$^{2+}$ ions are reduced at the negative (fuel) electrode. Simultaneously at the air electrode, an oxidation reaction that results in the evolution of molecular oxygen occurs.

In aqueous metal-air batteries the oxidation reaction at the air electrode during charge is simply the oxidation of water. This reaction, in addition to releasing O$_2$ gas, results in H$^+$ ions migrating through the cell. However, because zinc has a large overpotential for the hydrogen reduction reaction in aqueous electrolytes, faradaic efficiencies on the of order 95% are seen. The faradaic or current efficiency is the efficiency with which charge (electrons) are transferred in an electrochemical system. Electron losses are generally caused by electrons which participate in unproductive reactions and short circuits. Hydrogen reduction is an example of such an unproductive reaction. Thus, the large overpotential for hydrogen reduction (i.e., the barrier which must be overcome for hydrogen reduction) on zinc means that hydrogen reduction is unfavorable, resulting in a high faradaic efficiency.

By detuning the hydrophobicity of ionic liquids to allow anywhere from 0.1-10% (or even higher) water into a zinc-air ionic liquid battery, the oxidation reactions at the air electrode during charge are supported—that is, water is made available at the oxygen electrode for oxidation. Additionally, small quantities of water within ionic liquids destabilize the well known superoxide species (HO$_2$) that is generated in aprotic media, high pKa conjugate acids, and basic media via disproportionation reactions.

An additional benefit to adding water to the ionic liquid is that the H$^+$ ions released from the water oxidation reaction transiently mildly acidify the electrolyte thereby promoting the solvation of the ZnO precipitate. More specifically, the ion may increase acidity local to the ZnO precipitate, but may not acidify the solution on a bulk scale. The solvation of ZnO can be described in the following reaction:

$$ZnO + 2H^+ \rightarrow Zn^{2+} + H_2O \qquad (3)$$

Further, small quantities of water in ionic liquids may substantially decrease viscosity, resulting in an increase in conductivity.

In addition, the faradaic efficiency in aqueous electrolytes is high (~95%). This is true even without the specific adsorption of ionic liquid ions (or additives within the cell). Because of the high faradaic efficiency in aqueous electrolytes, an ionic liquid electrolyte with a 5% water content is expected to have a faradaic loss on the order of 0.25% (5% water content*5% loss=0.25%).

Further, in some embodiments, the hydrophobicity of the ionic liquid can be tuned with the addition of at least one hydrophilic or hygroscopic additive, such as a hygroscopic salt (e.g. $ZnCl_2$), $Zn(BF_4)_2$, $Zn(acetate)_2$, $Zn(TFSI)_2$). That is, the hygroscopic additive can modulate the hydrophobicity of the ionic liquid to maintain the water concentration in the ionic liquid within a desired range or at or near a desired steady state target. The hygroscopic salt can be used to provide a driving force for water intake into the ionic liquid. Via this hydrophobic/hydrophillic hybridization, and equilibration with the surrounding atmosphere, a constant water activity or water activity within a desired range can be maintained within the cell.

The term hygroscopic as used herein refers to an additive that has a strong enough hydrophilicity (i.e., affinity for water) that it will actively absorb or uptake water vapor from ambient air under standard conditions at a rate or capacity greater than what would be dictated by equilibrium conditions. Hydrophilic means having an affinity for water, and thus hygroscopic is a subset of hydrophilic. An additive that is merely hydrophilic may be used to modulate the hydrophobicity of the ionic liquid, but preferably its hydrophilicity is high enough to be hygroscopic. In contrast, something that is hydrophobic repels water (although some minor amount may be present due to equilibrium conditions).

Characteristics of an example electrolyte system is illustrated in FIG. 1. FIG. 1 is a plot of the water concentration as a function of time for choline bis(trifluoromethylsulfonyl)imide/$ZnCl_2$ electrolyte system. Alternatively, a butylmethylpyrrolidinium bis(trifluoromethylsulfonyl)imide (c4mPyrTFSI)/$ZnCl_2$ electrolyte system may be used. For this experiment, 100 microliter drops of electrolyte were placed on glass microscope slides and allowed to equilibrate with the ambient air laboratory environment, which had a relative humidity in the range of 20-40%. The water content was determined periodically with Karl-Fisher titration. When 10 mM of $ZnCl_2$ is added to choline bis(trifluoromethylsulfonyl)imide and allowed to sit on a counter, the water content rises from essentially zero to 13000 ppm (1.3%) in an hour (i.e., after the ionic liquid's initial exposure to the ambient air). Within 24 hours, the water content reaches a steady state concentration of approximately 15000 ppm (1.5%). If 100 mM of $ZnCl_2$ is added, the water content rises from essentially zero to 15000 ppm (1.5%) in an hour and reaches a steady state concentration of approximately 17000 ppm (1.7%) in 24 hours (i.e., after the ionic liquid's initial exposure to air). When 440 mM of $ZnCl_2$ is added instead, the water content rises from essentially zero to 41000 ppm (4.1%) in an hour and reaches a steady state concentration of approximately 52000 ppm (5.2%) in 24 hours. The presented data was measured in a laboratory with a relative humidity in the range of 20-40% and temperature of 22 degrees C. The relative humidity range will impact the equilibrium water contents, with higher relative humidity resulting in higher water content and concomitantly lower relative humidity resulting in a lower water content. Ideally, the equilibration experiments are conducted under controlled atmospheric relative humidity and temperature.

FIG. 1 shows that adding a hygroscopic compound to a hydrophobic IL can result in an IL which maintains a well defined water concentration. Preferably, the water intake kinetics and steady state concentration are stable over a wide range of relative humidity. Preferably, the kinetics and steady state concentration are stable in a range of relative humidity between 5% and 100%. Preferably, the kinetics and steady state concentration are stable in a range of relative humidity between 15% and 95%. Preferably, the kinetics and steady state concentration are stable in a range of relative humidity between 25% and 95%. Additionally, the experiment illustrated by FIG. 1 was conducted without the water being consumed in an electrochemical reaction.

In other embodiments, an example hydrophobic/hydrophilic electrolyte system is an ionic liquid comprised of an ad-mixture of hydrophobic and hydrophilic ionic liquids or an ad-mixture of hydrophobic and hygroscopic ionic liquids. The precise nature of the native hydrophobicity/hydrophilicty/hygroscopicity of the ionic liquids in the ad-mixture, along with the relative proportion of each constituent determines the water content in equilibrium under a given set of atmospheric conditions. One non-limiting example of ad-mixture tuned hydrophobicity is an electrolyte comprising 0.1 M Zn(Tfsi)$_2$ added into a mixture of butylmethylpyrrolidinium bis(trifluoromethylsulfonyl)imide (c4mPyrTFSI), a hydrophobic IL, and butylmethylpyrrolidinium trifluoromethanesulfonate (c4mPyr triflate), a hygroscopic IL. The more (c4mPyr triflate) in the (c4mPyrTFSI):(c4mPyr triflate) ad-mixture the less hydrophobic the resulting IL.

In another non-limiting embodiment, the hydrophobic ionic liquid is butylmethylpyrrolidinium bis (trifluromethylsulfonyl) imide (c4mPyrTFSI), preferably with the anions and cations in equal or essentially equal proportions and the hygroscopic additive is Zn(TFSI)$_2$, preferably in a concentration of 10 mM-1.4 M, and preferably in a concentration of 1 M. The water content in the ionic liquid preferably reaches a study state concentration between 70,000 ppm-100,000 ppm (7-10%) in 24 hours after initial exposure to ambient air in the noted humidity ranges discussed herein. In other embodiments, a protic IL may be added to an aprotic IL. The addition may be performed via titration or any other suitable method. In this manner, protons can be added to a predominately aprotic IL, thereby further improving the oxygen reduction reaction. Indeed, because the addition of the protic IL may be precisely controlled, the proton activity may be tailored as desired.

ILs with stable F-containing ions have been found to impart hydrophobicity. In particular, the aprotic anions hexafluorophosphate ($PF_6^-$), tetrafluoroborate, bis(trifluoromethylsulfonyl)imide ($C_2F_6NO_4S_2^-$), nonaflate, bis(tosyl)imide, and trifluoromethanesulfonate ($CF_3O_3S^-$) have been identified as anions which impart suitable hydrophobicity.

Reference may be made to U.S. patent application Ser. Nos. 61/267,240 and 12/776,962 for further details concerning the construction and operation of a metal-air low temperature ionic liquid cell, the entirety of which is incorporated herein.

In a metal-air battery, the metal is the fuel. That is, during discharge the metal is oxidized at the anode, providing electrons which can be used for electrical work. The oxidation reaction may be represented by the following equation:

$$\text{Metal} \rightarrow \text{Metal}^{n+} + (n)e^- \qquad (3)$$

The metal fuel may be of any type, and may be electrodeposited, absorbed, physically deposited, or otherwise provided on or constituting the fuel electrode. The fuel may be of any metal, including alloys or hydrides thereof, for example. For example, the fuel may comprise transition metals, alkali metals, alkali earth metals, and other or "poor" metals. Transition metals include, but are not limited to zinc, iron, manganese, and vanadium. The most common alkali metal is lithium but other alkali metals may be used. The other metals include, but are not limited to magnesium, aluminum and gallium. As used herein, the term metal fuel refers broadly to any fuel comprising a metal, including elemental metal, metal bonded in a molecule or complex, including oxides, metal alloys, metal hydrides, etc. The fuel electrode may be formed of the metal fuel as the electrode body itself in some embodiments.

The fuel electrode may have any construction or configuration. For example, the fuel electrode may be a porous structure with a three-dimensional network of pores, a mesh screen, a plurality of mesh screens isolated from one another, or any other suitable electrode. The fuel electrode includes a current collector, which may be a separate element, or the body on which the fuel is received may be electroconductive and thus also be the current collector. In an embodiment, the fuel electrode is laminated, bonded, or attached to a backing that provides the external surface of the fuel electrode. This backing may be liquid impermeable or essentially impermeable to the ionic liquid to prevent the ionic liquid from permeating outwardly through the fuel electrode via its external surface. More preferably, the backing is also impermeable to air, and particularly oxygen or other oxidant, to prevent any undesirable parasitic reaction, such as oxidant reduction in the presence of the fuel oxidation that occurs at the electrode during discharge.

Further details regarding metal fuels and fuel electrodes may be found in U.S. Pat. Nos. 8,168,337; 8,309,259; 8,492, 052; 8,491,763; and 8,632,921, and U.S. patent application Ser. No. 12/885,268, (abandoned), U.S. Ser. Nos. 12/631, 484, 13/028,496, 61/193,540, 61/301,377, 61/323,384, 61/329,278, 61/365,645, 61/394, 954, 61/358,339, 61/383, 510 and 61/243,970, the entirety of which are incorporated herein.

During discharge, oxygen at the air electrode is reduced, consuming electrons. There are several possible mechanisms for oxygen reduction. The oxygen reduction reaction may occur, for example, via one of the three mechanisms discussed below. Other mechanisms, however, may occur depending on the chemical system (ionic liquid, electrode materials) chosen.

A first possible and non-limiting mechanism is a four-electron oxygen reduction reaction (ORR) where the product is a fully reduced oxygen dianion. The four-electron oxygen reduction reaction may be represented by the following equation:

$$O_2 + 2H_2O + 4e^- \rightarrow 4OH^- \qquad (4)$$

Depending on the specific chemistry of the system, this reaction may form a soluble product or result locally in the formation of an insoluble metal-oxide.

In this reaction, the anions liberated may serve to mediate continued anode reaction. Relative to the other oxygen reduction mechanisms, the four-electron oxygen reduction reaction has the advantages of increased energy density and extracting the maximum number of electrons per oxygen molecule.

The second possible and non-limiting mechanism is a two-electron peroxide route. An examples of this mechanism may be represented by the following equation:

$$Zn^{2+} + O_2 + 2e^- \rightarrow ZnO_2 \qquad (6)$$

This mechanism has the advantage of relatively low overpotentials for the peroxide reaction. It also tends to have enhanced rechargeability relative to the first mechanism. The two-electron peroxide mechanism, however, results in lower energy density at the oxygen electrode battery relative to a four-electron process.

The third possible and non-limiting mechanism is a mixed two-electron/four-electron ORR that capitalizes on the reducing power of certain aliovalent cations. An examples of this mechanism may be represented by the following equation:

$$Mn^{2+} + O_2 + 2e^- \rightarrow MnO_2 \qquad (7)$$

The nuance in this mechanism is that the product involves fully reduced $O^{2-}$ species generated by the reducing power of the aliovlent metal. In this example, $Mn^{2+}$ ends up in the $Mn^{4+}$ state on the right. This mechanism has the advantage of lower overpotentials due to reducing power of the aliovalent cation. Further, aliovalent metals may be used to make more efficient cells. The mixed two-electron/four-electron mechanism, however, results in a lower energy density battery relative to a four-electron process.

Air electrodes are typically porous structures made of polytetrafluoroethylene (PTFE) materials such as Teflon®. Preferably, the air electrode material has a high degree of solvophobicity with the electrolyte. Solvophobicity within the air electrode serves the dual roles of "wet-proofing" (i.e. preventing liquid electrolyte from leaving the cell) and improving access of the oxygen in the air to the oxygen reduction reaction catalyst within the porous structure. Access to the catalyst is enhanced by solvophobicity due to an increase in the triple junction line length of air-catalyst-electrolyte. The increase in the triple junction line length reduces transport limitations. While a strong solvophobic character is advantageous, however, including solvophilic constituents in the electrode improves the tortuosity of the triple junction, improving superficial reaction site density.

Figure 2:
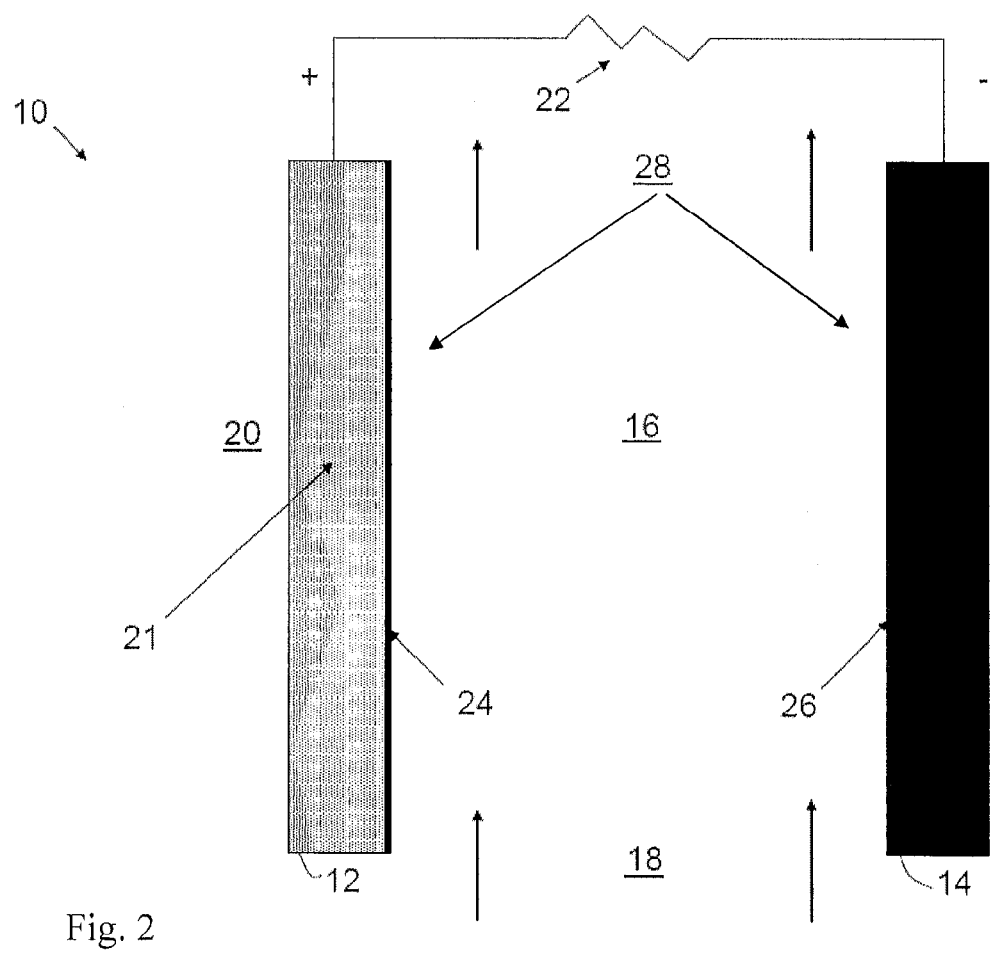
FIG. 2 is a schematic diagram of an electrochemical cell according to an embodiment of the invention.

FIG. 2 illustrates a low temperature IL electrochemical cell ("electrochemical cell"), generally indicated at 10, according to the embodiments of the present invention. As illustrated and described below, the electrochemical cell 10 includes a plurality of electrodes including a first electrode 12 and a second electrode 14. In other embodiments, the first electrode or the second electrode of the electrochemical cell 10 may be provided by configurations other than a single electrode. Thus, the use of a single electrode as presented in FIG. 1 for each of the first electrode 12 and the second electrode 14 is not intended to be limiting. In the non-limiting embodiment illustrated in FIG. 1, the first electrode 12 is a cathode, and more specifically an air cathode, and will be referred to hereinafter as an air electrode 12. The second electrode 14 is an anode, and will be referred to hereinafter as a metal electrode 14. In an embodiment, and as described below, the electrochemical cell 10 may generate electricity by virtue of an oxidation half-reaction of a fuel at the metal electrode 14 in parallel, that is, substantially at the same time, with a reduction half-reaction of an oxidizer 20 at the air electrode 12. The illustrated embodiment is not intended to be limiting in any way.

As shown in FIG. 2, and as discussed in further detail below, the air electrode 12 and the metal electrode 14 are spaced to form a gap 16 therebetween. An RTIL, generally indicated at 18, may flow along the gap 16 so that the low temperature IL 18 may contact both the air electrode 12 and the metal electrode 14 at the same time. In an embodiment, it should be understood that the electrochemical cell 10 may be oriented in any way, and the low temperature IL may flow in directions other than what is illustrated. Thus, any directional references are made with regard to the orientation as shown in FIG. 1, and are not intended to limit a working embodiment to any particular orientation. In other embodiments, the low temperature IL 18 may be static with no flow at all. The low temperature IL 18 may make contact with the air electrode 12 at an air electrode/low temperature IL interface 24. The low temperature IL 18 may make contact with the metal electrode 14 at a metal electrode/low temperature IL interface 26. In alternative embodiments, the low temperature IL does not flow. That is, no mechanism for forced flow is included in the cell.

As alluded to above, a reduction half-reaction may take place at the air electrode 12. In an embodiment, an oxidizer 20 may be reduced through the reduction half-reaction at the air electrode 12. For non-limiting illustration purposes, the electrons from the metal electrode 14 may flow to an external circuit 22 (i.e., a load) and return to the air electrode 12 to facilitate the reduction of the oxidizer 20. The oxidizer 20 is reduced on the air electrode 12 at oxidizer reduction reaction sites 21. In an embodiment, a catalyst is used to facilitate the oxidizer reduction half-reaction at the oxidizer reduction reaction sites 21. The air electrode 12 may include catalyst material, such as manganese oxide, nickel, pyrolized cobalt, activated carbon, silver, platinum, or any other catalyst material or mixture of materials with high oxygen reduction activity for catalyzing reduction of the oxidizer, which will be discussed below. In an embodiment, the air electrode 12 may be porous and the porous body with a high surface area may comprise the catalyst material.

In an embodiment, the air electrode 12 may be a passive or "breathing" air electrode 12 that is passively exposed, such as through windows or openings to an oxidizer source (typically oxygen present in ambient air) and absorbs the oxidizer 20 for consumption in the electrochemical cell 10 reactions. That is, the oxidizer 20, will permeate from the oxidizer source into the air electrode 12. Thus, the oxidizer 20 need not be actively pumped or otherwise directed to the air electrode 12, such as via an inlet. Any part of the air electrode 12 by which the oxidizer 20 is absorbed or otherwise permeates or contacts the air electrode 12 may be generically referred to as an "input." The term input may broadly encompass all ways of delivering oxidizer to the air electrode 12 for the oxidizer reduction half-reaction at the oxidizer reduction reaction sites 21 on the air electrode 12.

By means of a non-limiting illustration, the air electrode 12 may be a gas permeable electrode having an outer surface exposed to ambient air such that the oxidizer 20 comprises oxygen that permeates the air electrode 12. Similarly, the air electrode 12 may comprise a barrier membrane on the outer surface of the air electrode 12 that is gas permeable and liquid impermeable so as to permit permeation of the oxidizer 20 via the outer surface of the air electrode 12 and prevent the low temperature IL 18 from flowing through the outer surface of the air electrode 12. In an embodiment, the air electrode 12 may be a porous body covered on the inner side by a liquid permeable layer through which the low temperature IL 18 may pass through so that the low temperature IL 18 may contact the porous body.

The relationship between the low temperature IL 18 and the air electrode 12 may impact the overall energy density of the electrochemical cell 10. For that reason, the vapor pressure and surface tension characteristics of the low temperature IL 18 in view of the air electrode 12 should be carefully selected. For instance, in an embodiment, the air electrode 12 may repel the low temperature IL so that it may prevent the low temperature IL 18 from wicking, that is, flowing in a capillary-like manner through the air electrode 12. In another embodiment, the air electrode 12 may be designed with porosity to absorb the low temperature IL so that it exposes the low temperature IL to more air electrode 12 surface area for purposes of enabling the desired electrochemical reactions at the air electrode 12. The air electrode 12 may support catalyst decoration at the oxidizer reduction reaction sites 21 to improve the efficiency of the reaction. In an embodiment, the catalyst may be decorated with metal ions which may enhance the activity of the catalyst in catalyzing the oxidizer reduction reaction at the oxidizer reduction reaction sites 21 on the air electrode 12. The air electrode 12 may have a high ionic conductivity to provide reactants and remove products of the oxidizer reduction reaction from the air electrode 12. In an embodiment, the air electrode 12 may have high electrical conductivity character to carry electrons from the external load 22 to the oxidizer reduction reaction sites 21. The air electrode 12 and low temperature IL 18 characteristics may be further defined.

In an embodiment, the metal-oxide by-products 28 may be formed at the metal electrode 14. Whereas reduced oxidizer ions in an aqueous electrolyte coordinate, that is, donate electrons to water molecules to form water, peroxides and/or hydroxides, and thereby increase problems with vapor pressure and corrosion, in this non-limiting embodiment, the low temperature IL 18 may promote both the oxidizer reduction reaction at the air electrode 12 and the conduction of the reduced oxidizer ions to the metal electrode 14. In support of this result, the low temperature IL 18 may contain soluble species that interact with the reduced oxidizer ions, with the low temperature IL 18 typically being protic. The low temperature IL 18 may also support the reduced oxidizer ions as they migrate to the metal electrode 14. By means of a non-limiting illustration, the migration of the reduced oxidizer ions may refer to transport of the reduced oxidizer ions via convection transport, or conduction transport or diffusion transport. The low temperature IL 18 may also support the oxidized metal-fuel ions remaining at the metal electrode 14. In doing so, the low temperature IL 18 promotes the reaction between the reduced oxidizer ions and the oxidized metal-fuel ions to produce the metal-oxide by-products 28. In an embodiment, the metal-oxide by-products 28 may be stored at the metal electrode 14. In an embodiment where the metal-oxide by-product 28 is stored at the metal electrode 14, this embodiment is best used as a primary (i.e., non-rechargeable) battery, as the oxygen is stored at the metal electrode 14 and is not locally available to an oxygen evolving electrode for oxidation of the reduced oxygen species.

In another embodiment, the metal-oxide by-products 28 may be formed at the air electrode 12. In this non-limiting embodiment, the air electrode 12 catalyzes the oxidizer reduction reaction at the oxidizer reduction reaction sites 21 at the air electrode 12. In an embodiment, the low temperature IL 18 (typically aprotic) may be chemically compatible with pure metal or metal alloy, and high concentrations of the oxidized metal-fuel ions may exist in the low temperature IL 18. In another embodiment, metal ions are added to the electrolyte which form metal-oxide by-products 28 at the air electrode 12. As discussed above, the added metal ions may or may not be of the same metal as the metal electrode. In another embodiment, the metal-oxide by-products 28 are stored locally at the air electrode 22. Because metal-oxide by-products 28 are formed and stored locally at the air electrode 12 during discharge, a ready supply of oxygen (present in the locally stored metal oxide) is locally available at the air electrode during recharge. In this manner, the reversibility of the cell can be improved. In contrast, where the oxides are stored in the ionic liquid electrolyte, the oxides are typically distributed throughout the electrolyte, and the amount of oxide available to the air electrode is limited to the electrolyte/ air interface and rate at which the oxide can diffuse within the electrolyte to that interface.

The storage of the metal oxide locally at the air electrode is facilitated by the air electrode 12 having a pore size in at least the regions contacting the ionic liquid sufficient to contain the oxide within the air electrode 12 body. That is, the pore size may be dependent on the size of the oxide. A network of such pores may increase the storage capacity of the air electrode 12.

In another embodiment, the low temperature IL 18 may support solvating these oxidized metal-fuel ions at the metal electrode 14. That is, the low temperature IL ions may surround the metal-fuel ions, and in doing so, the low temperature IL 18 may help to maintain the metal-fuel ionic form as the solvated, oxidized metal-fuel ions migrate to the air electrode 12. Typically, the low temperature. IL will be aprotic. By means of a non-limiting illustration, the migration of the solvated, oxidized metal-fuel ions may refer to transport of the solvated, oxidized metal-fuel ions via convection transport, or conduction transport or diffusion transport. Once at the air electrode 12, the solvated metal-fuel ions may react with the reduced oxidizer ions, and this reaction may result in metal-oxide by-products 28. In an embodiment, the metal-oxide by-products 28 may be stored at the air electrode 12.

In an embodiment, the metal-oxide by-product 28 may catalyze the oxidizer reduction reaction at the air electrode 12. In an embodiment, the electrochemical cell 10 may include a regenerative electrochemical cell and an oxygen recovery system. Examples of such devices are shown, for example, in U.S. Pat. No. 8,491,763, filed on Aug. 28, 2009, which is incorporated herein by reference in its entirety.

In an embodiment, the oxidizer source is ambient air, and the oxidizer 20 is oxygen. In an embodiment, oxygen as the oxidizer 20 may be reduced at the air electrode 12 to form reduced oxygen ions. In an embodiment, the oxygen may be supplied from an evolved oxygen recovery system used in a regenerative electrochemical cell. Other examples of electrochemical cells that may be useful embodiments of the invention herein are shown, for example, in U.S. Pat. No. 8,491, 763, filed on Aug. 28, 2009, which is incorporated herein by reference in its entirety.

The electrolytes of the present invention may be used in other cell configurations. An alternate cell configuration, for example, comprises a compact wound cell illustrated in U.S. patent application Nos. 61/267,240 and 12/776,962, hereby incorporated by reference in their entirety.

Because of evaporation, water electrolysis during recharging, and self-discharge, aqueous electrolytes are problematic for metal air batteries. These problems not only result in a loss of electrolyte but also a reduction in the round trip efficiency of a rechargeable battery. The use of an ionic liquid electrolyte reduces or may eliminate some of these problems. Even with an ionic liquid electrolyte, however, the presence of water may cause the release of toxic gases and/or cause self-discharge. On the other hand, an ionic liquid electrolyte according to embodiments of the invention may include small amounts of water. For example, water contents of 10-100 ppm have been found to improve oxygen reduction of aprotic systems without causing unacceptable self-discharge or release of toxic gases.

The forgoing embodiments have been provided solely to illustrate example of the present invention and should not be considered limiting. To the contrary, the present invention encompasses all modifications, substitutions, alterations, and equivalents with in the spirit and scope of the appended claims.

The subject matter claimed in this application was made under a joint research agreement qualifying under 35 U.S.C. §103 (c)(2) and (3) to which Fluidic, Inc. and Arizona Science and Technology Enterprises, LLC acting as the exclusive master licensee for Arizona State University are parties.

What is claimed is:

1. An electrochemical cell comprising:
an ionically conductive medium comprising a hydrophobic low temperature ionic liquid comprising positive ions and negative ions and at least one hygroscopic additive selected from the group consisting of $ZnCl_2$, $Zn(BF_4)_2$, $Zn(acetate)_2$, and mixtures thereof;
a fuel electrode for oxidizing a fuel; and
an air electrode for absorbing and reducing gaseous oxygen,
wherein the hygroscopic additive modulates the hydrophobicity of the ionically conductive medium to maintain a concentration of water in the ionically conductive medium between 0.001 mol % and 25 mol % when the ionically conductive medium is allowed to equilibrate with an ambient air laboratory environment at 22° C. across a relative humidity of 20% to 40%.

2. The electrochemical cell of claim 1, wherein the air electrode comprises polytetrafluoroethylene (PTFE).

3. The electrochemical cell of claim 1, wherein the air electrode is porous.

4. The electrochemical cell according to claim 1, wherein the fuel electrode comprises a metal fuel.

5. The electrochemical cell of claim 1, wherein the fuel electrode is porous.

6. The electrochemical cell of claim 1, wherein the low temperature ionic liquid is aprotic.

7. The electrochemical cell of claim 1, wherein the hydrophobic ionic liquid is selected from the group consisting of choline bis(trifluoromethylsulfonyl)imide, butylmethylpyrrolidinium bis(trifluoromethylsulfonyl)imide (c4 mPyrTFSI), and n-ethyl n-methylmorpholinium bis(trifluoromethylsulfonyl)imide (c2 nmm TFSI).

8. The electrochemical cell of claim 1, wherein the concentration of the hygroscopic additive is between 10 and 500 mM.

9. The electrochemical cell of claim 8, wherein the concentration of the hygroscopic additive is between 10 and 100 mM.

10. The electrochemical cell of claim 9, wherein the hydrophobicity of the ionically conductive medium is such that the water content rises from essentially zero to approximately 13000 ppm (1.3%) in an hour when the ionically conductive medium is initially exposed to the ambient air.

11. The electrochemical cell of claim 10, wherein the hydrophobicity of the ionically conductive medium is such that the water content reaches a steady state concentration of approximately 15000 ppm (1.5%) in 24 hours when the ionically conductive medium is initially exposed to the ambient air.

12. The electrochemical cell of claim 8, wherein the hydrophobicity of the ionically conductive medium is such that the water content rises from essentially zero to approximately 15000 ppm (1.5%) in an hour when the ionically conductive medium is initially exposed to the ambient air.

13. The electrochemical cell of claim 12, wherein the hydrophobicity of the ionically conductive medium is such that the water content reaches a steady state concentration of approximately 17000 ppm (1.7%) in 24 hours when the ionically conductive medium is initially exposed to the ambient air.

14. The electrochemical cell of claim 8, wherein the hydrophobicity of the ionically conductive medium is such that the water content rises from essentially zero to approximately 41000 ppm (4.1%) in an hour when the ionically conductive medium is initially exposed to the ambient air.

15. The electrochemical cell of claim 14, wherein the hydrophobicity of the ionically conductive medium is such that the water content reaches a steady state concentration of approximately 52000 ppm (5.2%) in 24 hours when the ionically conductive medium is initially exposed to the ambient air.

16. The electrochemical cell of claim 1, wherein the low temperature ionic liquid comprises a vapor pressure at or below 1 mm Hg at 20° C. above its melting point.

17. The electrochemical cell of claim 1, wherein the low temperature ionic liquid comprises an anion comprising bis(trifluoromethylsulfonyl)imide (TFSI).

18. The electrochemical cell of claim 1, wherein the low temperature ionic liquid comprises cations selected from the group consisting of Choline, butylmethylpyrrolidinium (c4 mPyr), n-ethyl n-methylmorpholinium, butyl pyridinium, and alkyl imidizolium.

19. The electrochemical cell of claim 1, wherein the air electrode includes a catalyst.

20. The electrochemical cell of claim 19, wherein, the catalyst is selected from the group consisting of manganese oxide, nickel, pyrolized cobalt, activated carbon, silver, platinum, and mixtures thereof.

21. The electrochemical cell of claim 1, wherein the ionically conductive medium consists of the hydrophobic low temperature ionic liquid and the at least one hygroscopic additive.

22. The electrochemical cell of claim 1, wherein the ionically conductive medium consists essentially of the ionic liquid and the at least one hydrophilic additive.

23. An ionically conductive medium for use in an electrochemical cell comprising a fuel electrode and an air electrode for absorbing and reducing gaseous oxygen, comprising:
  a hydrophobic low temperature ionic liquid comprising positive ions and negative ions; and
  at least one hygroscopic additive selected from the group consisting of $ZnCl_2$, $Zn(BF_4)_2$, $Zn(acetate)_2$, and mixtures thereof, wherein the hygroscopic additive modulates the hydrophobicity of the ionic liquid to maintain a concentration of water in the ionically conductive medium between 0.001 mol % and 25 mol % when the ionically conductive medium is allowed to equilibrate with an ambient air laboratory environment at 22° C. across a relative humidity of 20% to 40%.

* * * * *